US008956559B2

(12) United States Patent
Kimura et al.

(10) Patent No.: US 8,956,559 B2
(45) Date of Patent: Feb. 17, 2015

(54) TUBULAR MEMBER EXTRUSION METHOD AND TUBULAR MEMBER EXTRUSION APPARATUS

(75) Inventors: Yoji Kimura, Kiyosu (JP); Kyohei Sato, Kiyosu (JP); Hiroshi Yamaguchi, Kiyosu (JP); Yukio Miura, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 627 days.

(21) Appl. No.: 12/911,062

(22) Filed: Oct. 25, 2010

(65) Prior Publication Data
US 2011/0101562 A1 May 5, 2011

(30) Foreign Application Priority Data
Oct. 29, 2009 (JP) ................................. 2009-248353

(51) Int. Cl.
| | | |
|---|---|---|
| B29C 53/08 | (2006.01) | |
| B29C 47/22 | (2006.01) | |
| B29C 47/24 | (2006.01) | |
| B29C 47/28 | (2006.01) | |
| B29C 47/00 | (2006.01) | |
| B29K 21/00 | (2006.01) | |
| B29L 23/00 | (2006.01) | |

(Continued)

(52) U.S. Cl.
CPC ............... B29C 47/28 (2013.01); B29C 47/24 (2013.01); *B29C 47/0023* (2013.01); *B29C 47/0026* (2013.01); *B29C 47/0038* (2013.01); *B29K 2021/00* (2013.01); *B29L 2023/005* (2013.01)
USPC ............... 264/209.2; 264/40.7; 264/177.16; 264/209.3; 264/209.8; 264/285

(58) Field of Classification Search
None
See application file for complete search history.

(56) References Cited

U.S. PATENT DOCUMENTS 1,916,645 A * 7/1933 Taylor ............................. 72/260
2,819,794 A * 1/1958 Krause ............................ 72/260
(Continued)

FOREIGN PATENT DOCUMENTS

CN 2085721 A 10/1991
GB 2295349 A 5/1996
(Continued)

OTHER PUBLICATIONS

Goettler et al., Extrusion Shaping of Curved Hose Reinforced with Short Cellulose Fibers, Rubber Chemistry and Technology, vol. 54, pp. 277-301, 1981.*
(Continued)

*Primary Examiner* — Jeffrey Wollschlager
(74) *Attorney, Agent, or Firm* — Posz Law Group, PLC

(57) ABSTRACT

According to a fabrication method, an extruded tubular member HA is formed, using an extrusion die 23 which has an extrusion orifice 25 having an opening-side inner circumferential surface 25a having a circular section and a core-side die 26 disposed concentrically with the extrusion orifice 25, by extruding a tube material through an extrusion passage 27 defined between the opening-side inner circumferential surface 25 and a core-side outer circumferential surface 26d of the core-side die 26. As this occurs, a bent configuration is given to the extruded tubular member HA by changing contact areas where the tube material contacts the opening-side inner circumferential surface 25a and the core-side outer circumferential surface 26d in a circumferential direction so as to set velocities at which the tube material is extruded to different values in the circumferential direction by controlling the position of the core die 26 in rotating and axial directions relative to the extrusion orifice 25.

10 Claims, 12 Drawing Sheets

(56) References Cited

U.S. PATENT DOCUMENTS

| | | | |
|---|---|---|---|
| 5,003,806 A * | 4/1991 | Nemoto | 72/260 |
| 5,069,853 A * | 12/1991 | Miller | 264/176.1 |
| 5,156,862 A * | 10/1992 | Kawaguchi | 425/325 |
| 5,286,183 A * | 2/1994 | Tonsi et al. | 425/113 |
| 5,305,626 A * | 4/1994 | Tiekink | 72/257 |
| 5,599,492 A * | 2/1997 | Engelson | 264/167 |
| 6,213,828 B1 * | 4/2001 | Tsumiyama et al. | 440/89 R |
| 6,470,726 B1 * | 10/2002 | Murata et al. | 72/260 |
| 8,017,053 B2 * | 9/2011 | De Rijcke et al. | 264/209.8 |
| 2004/0020260 A1 * | 2/2004 | Jin | 72/260 |

FOREIGN PATENT DOCUMENTS

| | | | |
|---|---|---|---|
| JP | 58184012 | * | 10/1983 |
| JP | 1431781 A | | 3/1988 |
| JP | 7266401 A | | 10/1995 |
| JP | A-10-283682 | | 10/1998 |
| WO | WO2005021643 | * | 3/2005 |

OTHER PUBLICATIONS

Office Action issued in corresponding Chinese application 201010530295.5 on Feb. 18, 2013.

* cited by examiner ic # TUBULAR MEMBER EXTRUSION METHOD AND TUBULAR MEMBER EXTRUSION APPARATUS

BACKGROUND OF THE INVENTION

1. Field of the Invention

The present invention relates to a method for fabricating a bent tubular member for use in a hot water line or a fuel line of a motor vehicle or other machines and a tubular member extrusion apparatus.

2. Description of the Related Art

A conventional hose fabrication method for fabricating the type of bent hose described above comprises the following steps. Namely, a hose intermediate is formed by extruding an un-vulcanized rubber. The hose intermediate formed is then cooled and is cut to a predetermined length after a parting agent has been applied thereto. Further, the hose intermediate is manually placed on a metallic mandrel having a bent shape for vulcanization so as to form a hose. Furthermore, the hose is manually removed from the mandrel. In the steps in which the metallic mandrel is used, since the placement of the hose intermediate on the mandrel and removal of the vulcanized hose from the mandrel are manually performed, there is caused a problem that these steps are troublesome.

In addition, as a method for fabricating an extruded product having a bent portion or portions, as is described in Patent Document 1, there has been known a method for fabricating an extruded material having a bent portion or portions. However, even in the event of this technique being applied, there has still been a problem that a three-dimensional complicated bent configuration cannot be dealt with.

Patent Document 1: JP-A-10-263682

SUMMARY OF THE INVENTION

The invention has been made with a view to solving the problems inherent in the related art, and an object thereof is to provide a method for fabricating a tubular member having a complicated bent configuration without using a mandrel and an extrusion apparatus for extruding such a tubular member.

The invention has been made with a view to solving at least part of the problems described above, and the invention can be realized as the following forms or application examples.

According to a first aspect of the invention, there is provided a method for forming an extruded tubular member, using an extrusion die that has an extrusion orifice having an inner circumferential surface that is disposed at an opening-side of the extrusion orifice and has a circular section, and a core-side die disposed concentrically with the extrusion orifice, by extruding a tube material through an extrusion passage defined between the inner circumferential surface and an outer circumferential surface of the core-side die, wherein the extruded tubular member is bent by changing contact areas where the tube material contacts the inner circumferential surface and the outer circumferential surface in a circumferential direction so as to set velocities at which the tube material is extruded to different values in the circumferential direction by controlling the position of the core-side die in rotating and axial directions relative to the extrusion orifice.

According to the first aspect of the invention, an extruded tubular member of a straight shape or even an extruded tubular member having a three-dimensional bent configuration with various radii of curvatures can be fabricated by extruding a rubber material continuously while controlling the position of the core-side die in the axial direction or the rotating direction, that is, changing the circumferential contact areas of the rubber material with the opening-side inner circumferential surface and the core-side outer circumferential surface of the extrusion die, whereby superior productivity can be provided.

In addition, a mandrel like the one described in the related art does not have to be inserted into the extruded tubular member for bending, and the work involved becomes simple, the superior productivity being thereby provided.

According to a second aspect of the invention, the core-side die has an inclined plane at a distal end portion of the core-side die which results when a circular cylinder is cut obliquely, whereby the circumferential contact area can be changed by a simple approach.

According to a tubular member extrusion apparatus for forming an extruded tubular member by extruding a tube material, comprising: a hose extrusion unit having an extrusion die having an inner circumferential surface that is disposed at an opening-side of the extrusion orifice and has a circular section and has a circular section and a core-side die disposed concentrically with the extrusion orifice and that is adapted to extrude the tube material through an extrusion passage defined between the inner circumferential surface and an outer circumferential surface of the core-side die; a rubber extrusion unit configured to supply the tube material into the extrusion passage of the hose extrusion unit; and a die position control mechanism configured to change contact areas where the tube material contacts the inner circumferential surface and the outer circumferential surface in a circumferential direction so as to set velocities at which the tube material is extruded to different values in the circumferential direction by controlling the position of the core die in rotating and axial directions relative to the extrusion orifice.

DESCRIPTION OF THE PREFERRED EMBODIMENTS

(1) Schematic Configuration of a Hose H Having a Bent Configuration

Figure 1:
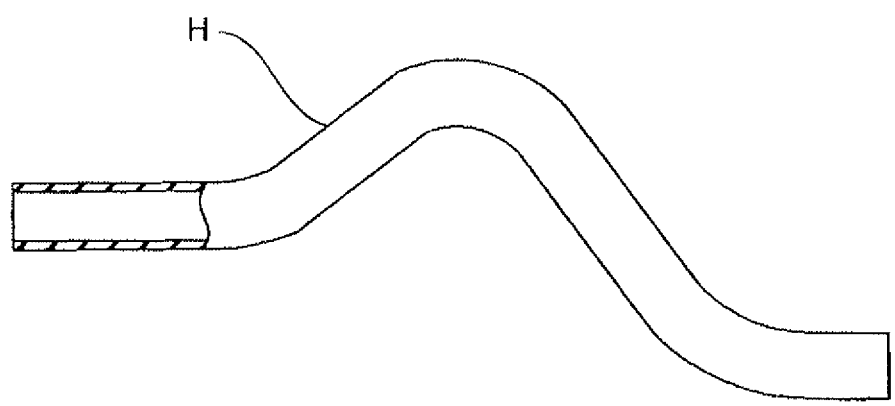
FIG. 1 is an explanatory diagram which explains a hose that is fabricated by a hose (tubular member) extrusion method according to an embodiment of the invention.

FIG. 1 is an explanatory diagram which explains a hose that is fabricated by a hose (tubular member) extrusion method according to an embodiment of the invention. A hose H is, for example, a rubber hose that is used in a location where a radiator and an engine is connected and is bent into a three-dimensional configuration to mach a disposition path within an engine compartment. The hose H is fabricated by a hose extrusion apparatus that will be described below.

(2) Hose Fabrication Method (2)-1 Hose Extrusion Apparatus 10

Figure 2:
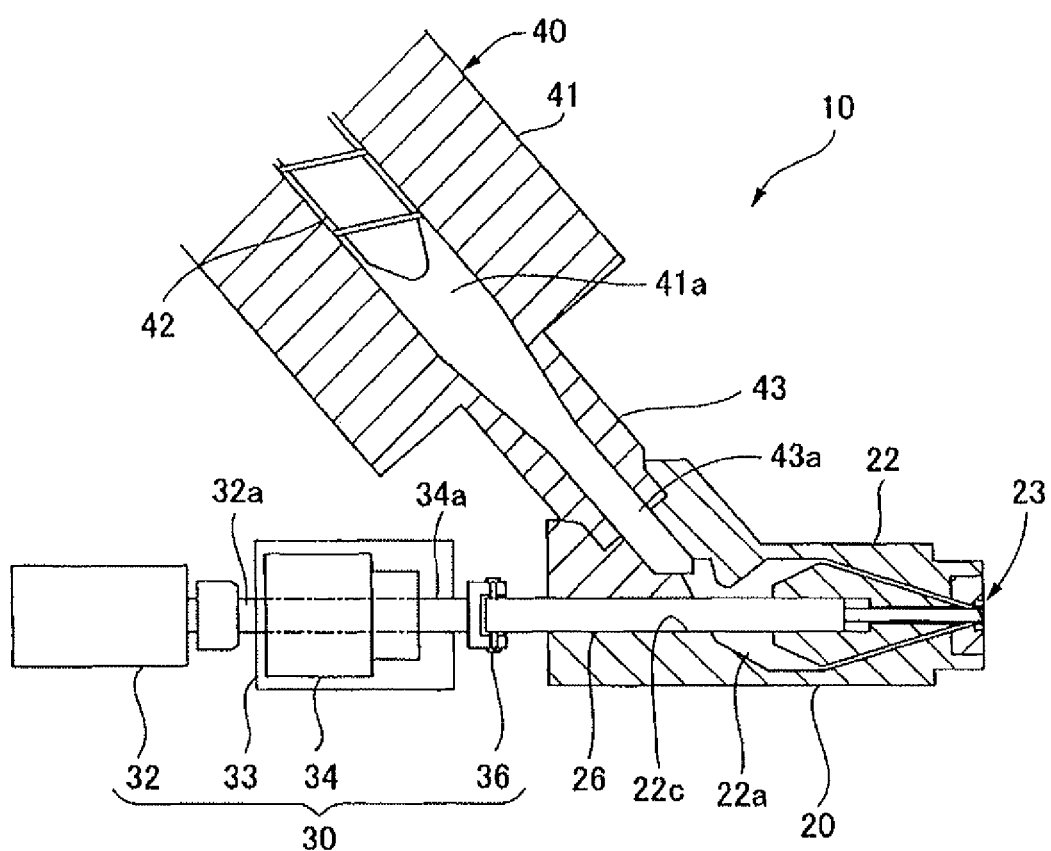
FIG. 2 is an explanatory diagram which explains a hose extrusion apparatus for extruding a hose.

FIG. 2 is an explanatory diagram which explains a hose extrusion apparatus 10 for extruding a hose H. The hose extrusion apparatus 10 includes a hose extrusion unit 20, a die position control mechanism 30 adapted to be driven to change a bent configuration of an extruded tubular member HA which is extruded from the hose extrusion unit 20, and a rubber extrusion unit 40 for supplying a rubber material (a tube material) into the hose extrusion unit 20.

Figure 3:
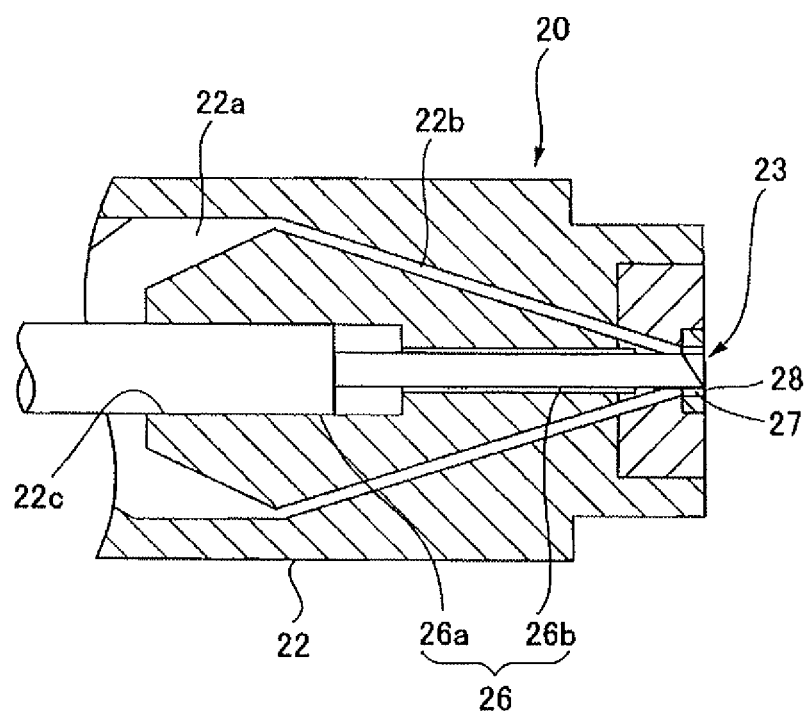
FIG. 3 is an explanatory diagram in which the hose extrusion apparatus shown in FIG. 2 is enlarged.

FIG. 3 is an explanatory diagram in which the hose extrusion unit 20 shown in FIG. 2 is enlarged. The hose extrusion unit 20 includes a die base 22 and an extrusion die 23 which is provided at an end portion of the die base 22. The die base 22 includes a material supply chamber 22a into which a rubber material which is supplied from the rubber extrusion unit 40 (FIG. 2) is supplied and a material supply passage 22b which is connected to the material supply chamber 22a for sending the rubber material to the extrusion die 23.

Figure 4:
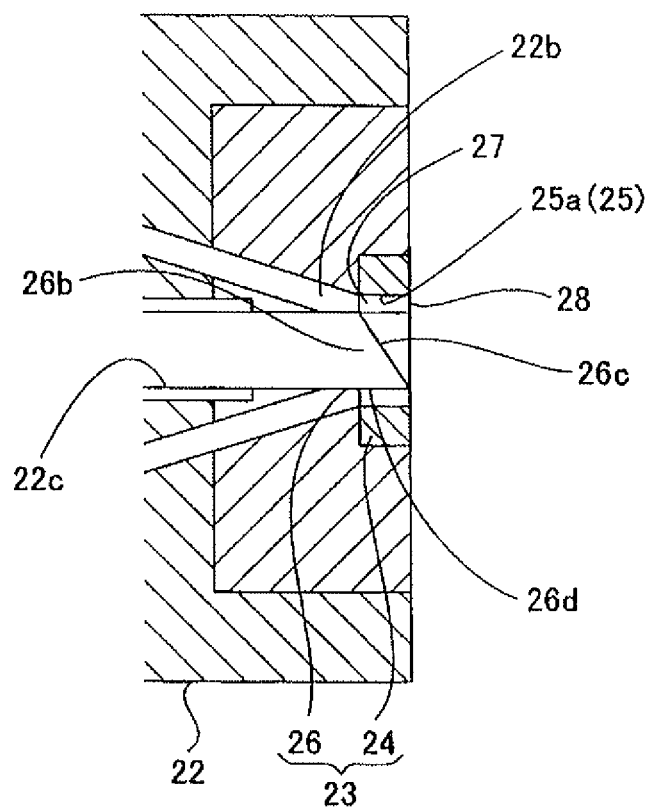
FIG. 4 is an explanatory diagram in which a portion in proximity to an extrusion die is enlarged.
Figure 5:
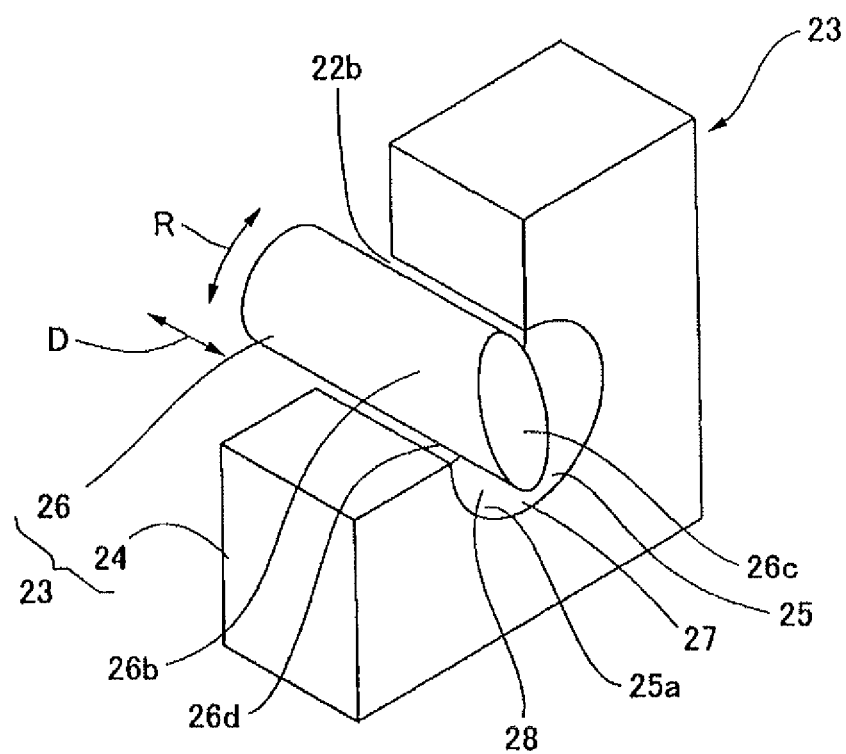
FIG. 5 is a perspective view of the extrusion die.
Figure 6:
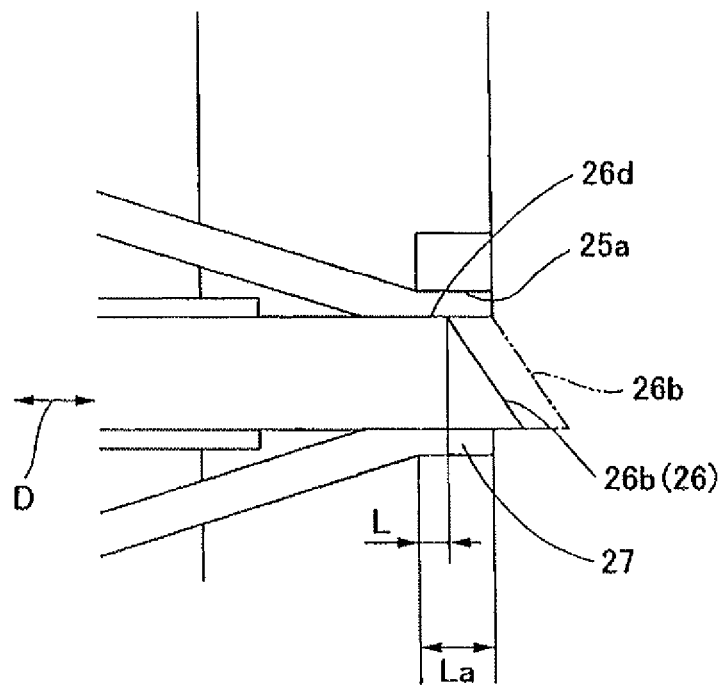
FIG. 6 is an explanatory diagram which explains the extrusion die.

FIG. 4 is an explanatory diagram in which a portion in proximity to the extrusion die 23 is enlarged, and FIG. 5 is a perspective view of the extrusion die 23. The extrusion die 23 includes an opening-side die 24 and a core-side die 26. The opening-side die 24 has an extrusion orifice 25 having an opening-side inner circumferential surface 25a whose inside diameter is set at a predetermined magnification relative to an outside diameter of a hose to be fabricated. An extrusion passage 27 is defined between the opening-side inner circumferential surface 25a and the core-side die 26 and is connected to the material supply passage 22b. The core-side die 26 shown in FIG. 3 includes a support base 26a which penetrates into a through hole 22c in the die base 22 and a core portion 26b which is formed integrally at one end of the support base 26a. The other end of the support base 26a is connected to the die position control mechanism 30 shown in FIG. 2, so that the support base 26a is supported within the through hole 22c so as to rotate as well as moving backwards and forwards. As is shown in FIGS. 4 and 5, a distal end of the core portion 26b is cut at a predetermined angle so as to produce an inclined plane 26c. In addition, an outer circumference of the core portion 26b constitutes a core-side outer circumferential surface 26d which faces the opening-side inner circumferential surface 25a. The extrusion passage 27 and an extrusion opening 28, which lies at an end portion of the extrusion passage 27, are defined between the opening-side inner circumferential surface 25a and the core-side outer circumferential surface 26d. Here, as is shown in FIG. 6, letting a length of the opening-side inner circumferential surface 25a in an axial direction D be La and a length over which the core-side outer circumferential surface 26d overlaps the opening-side inner circumferential surface 25a along the full circumference in the axial direction be an overlapping length L, the overlapping length L can be changed within a range defined as $0 \leq L < La$ depending upon an axial position of the core portion 26b of the core-side die 26. Namely, a contact area of a rubber material which passes through the extrusion passage 27 with both the opening-side inner circumferential surface 25a and the core-side outer circumferential surface 26d changes in a circumferential direction by changing the overlapping length L, whereby a frictional force of the rubber material with both the inner and outer circumferential surfaces is set to differ. Here, the axial length La of the opening-side inner circumferential surface 25a can be set to 10 mm. As this occurs, the overlapping length L is changed within a range from 0 to 10 mm.

In FIG. 2, the die position control mechanism 30 includes a lengthwise drive motor 32 and a rotating drive motor 34 which is placed on a support table 33. The lengthwise drive motor 32 can move the rotating drive motor 34 on the support table 33 in axial directions by driving a drive shaft 32a. The rotating drive motor 34 is coupled to one end of the core-side die 26 via a coupling 36 at a drive shaft 34a thereof. Consequently, the position of the core-side die 26 can be controlled in the axial direction as a result of the rotating drive motor 34 on the support table 33 being moved by driving the lengthwise drive motor 32. In addition, the position of the core-side die 26 can be controlled in the circumferential direction by driving the rotating drive motor 34.

The rubber extrusion unit 40 includes a cylinder 41 which defines a filling chamber 41a and a screw 42 which is disposed within the filling chamber 41a and is adapted to be driven to rotate by a motor, not shown. The rubber extrusion unit 40 connects to the die base 22 of the hose extrusion unit 20 through an injection passage 43a which is formed in an extrusion head 43 at a distal end of the cylinder 41. By adopting the configuration of the rubber extrusion unit 40, when the screw 42 is driven to rotate, a rubber material filled in the cylinder 41 is supplied into the hose extrusion unit 20 through the injection passage 43a.

(2)-2 Hose H Fabricating Method

Next, a process for fabricating a bent hose H by the hose extrusion apparatus 10 will be described. In the hose extrusion apparatus 10 shown in FIG. 2, the rubber material within the filling chamber 41a is supplied into the material supply chamber 22a of the hose extrusion unit 20 via the injection passage 43a by the screw 42 of the rubber extrusion unit 40 being driven to rotate. Then, as is shown in FIG. 3, the rubber material in the material supply chamber 22a passes through the material supply passage 22b and further passes through the extrusion passage 27 in the extrusion die 23, so that an extruded tubular member HA is extruded from the extrusion opening 28.

Figure 7:
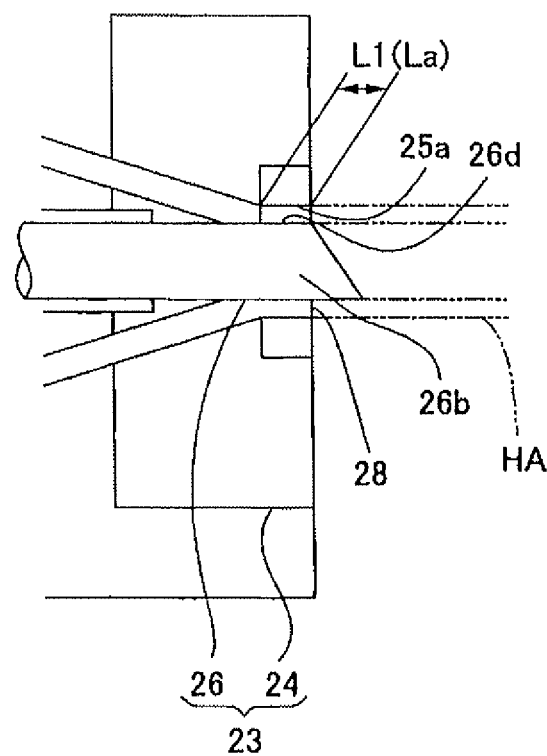
FIG. 7 is an explanatory diagram which explains a fabrication step performed by the hose extrusion apparatus.

In addition, a bending configuration of the hose H is determined by controlling the position of the core portion 26b of the core-side die 26 by the die position control mechanism 30. Let's assume that the core-side die 26 is located in a position shown in FIG. 7 as a result of a position control by the lengthwise drive motor 32 and the rotating drive motor 34 of the die position control mechanism 30 shown in FIG. 2. Namely, the core portion 26b of the core-side die 26 is set so that the overlapping length L over which the core-side outer circumferential surface 26d overlaps the opening-side inner circumferential surface 25a in the axial direction is L1 (La). In this state, the contact areas of the rubber material with the core-side outer circumferential surface 26d and the opening-side inner circumferential surface 25a in the circumferential direction when the rubber material is extruded from the extrusion opening 28 are equal. Therefore, the rubber material receives a uniform frictional force. Consequently, the rubber material is extruded at the same velocity along the circumferential direction, whereby an extruded tubular member HA having a straight shape is formed.

Figure 8:
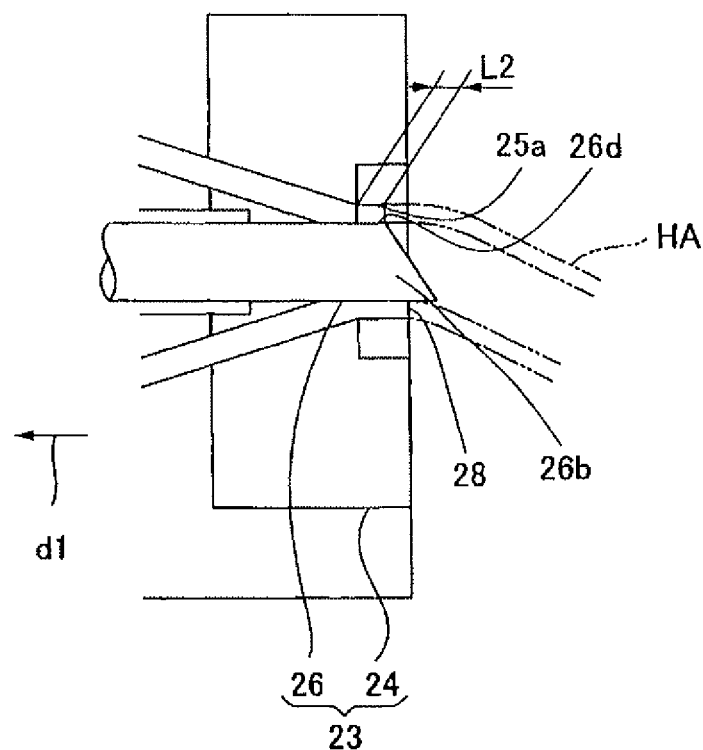
FIG. 8 is an explanatory diagram which explains a step that follows the step in FIG. 7.

Following this, the core-side 26 is moved in a direction indicated by an arrow d1 shown in FIG. 8 by driving the lengthwise drive motor 32 of the die position control mechanism 30 so as to decrease the overlapping length L to L2.

Then, when the rubber material is extruded from the extrusion opening 28, the contact areas of the rubber material with the core-side outer circumferential surface 26d and the opening-side inner circumferential surface 25a differ from each other, whereby the rubber material receives a larger frictional force at a lower portion than an upper portion. Consequently, the rubber material is extruded at different velocities along the circumferential direction, whereby the extruded tubular member HA is formed to be bent in the direction of the slower extruding velocity.

Figure 9:
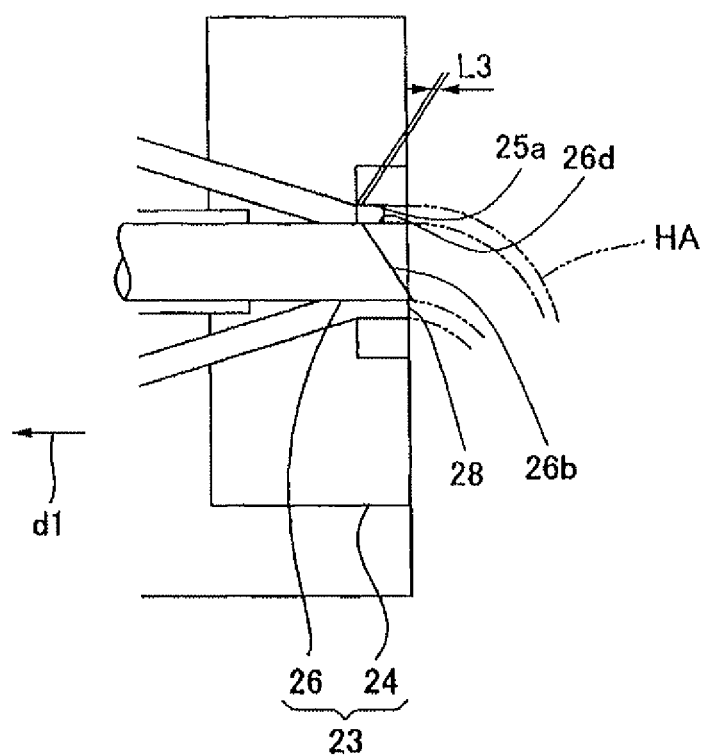
FIG. 9 is an explanatory diagram which explains a step that follows the step in FIG. 8.
Figure 10:
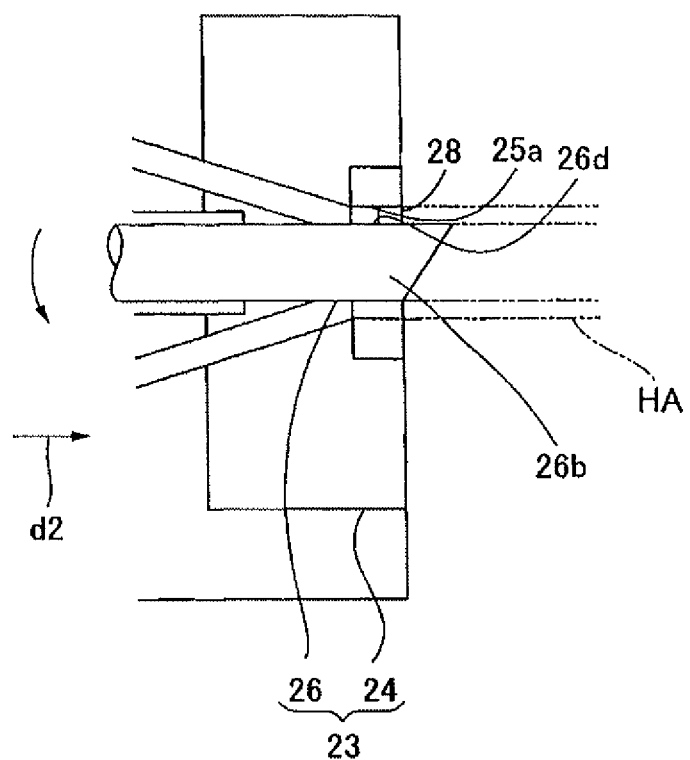
FIG. 10 is an explanatory diagram which explains a step that follows the step in FIG. 9.
Figure 11:
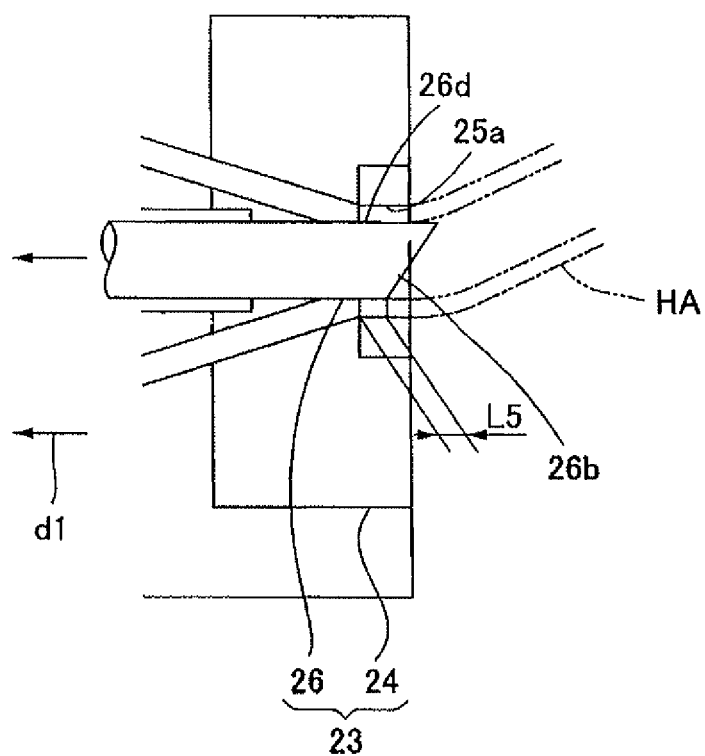
FIG. 11 is an explanatory diagram which explains a step that follows the step in FIG. 10.
Figure 12:
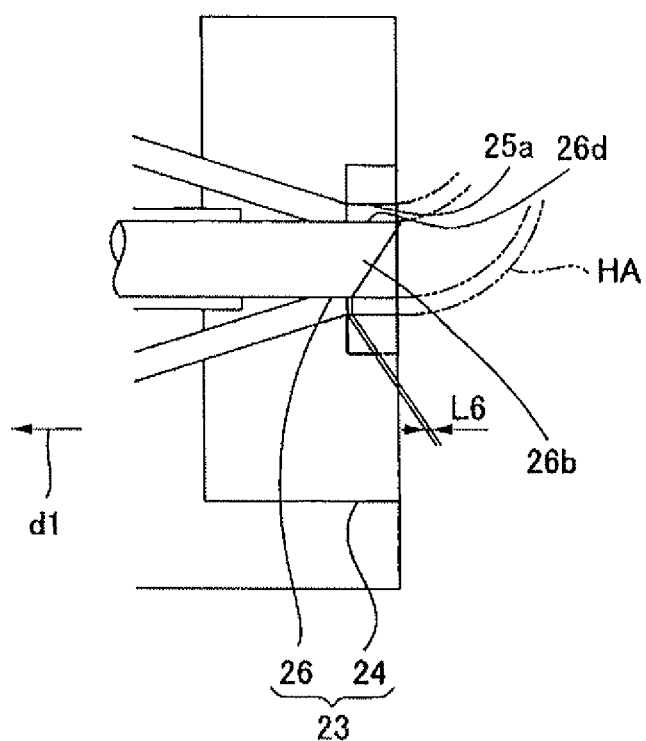
FIG. 12 is an explanatory diagram which explains a step that follows the step in FIG. 11.

When the core-side die 26 is moved further in the direction indicated by the arrow d1 as is shown in FIG. 9 so as to decrease the overlapping length L to L3, the difference in extruding velocity between in the circumferential positions increases, whereby the extruded tubular member HA is bent at a larger radius of curvature. Then, when the core-side die 26 is moved in a direction indicated by an arrow d2 and is further rotated through 180° as is shown in FIG. 10, the extruded tubular member HA becomes straight. Then, when the core-side die 26 is moved in the direction indicated by the arrow d1 as is shown in FIG. 11 so as to decrease the overlapping length L to L5, the extruded tubular member HA is bent upwards as is viewed in the figure. Further, when the core-side die 26 is moved in the direction indicated by the arrow d1 as is shown in FIG. 12 to decrease the overlapping length L to L6, the radius of curvature of the bent configuration of the extruded tubular member HA can be increased. Then, when it is extruded to a predetermined length, the extruded tubular member HA is cut. Then, the extruded tubular member HA so cut is loaded in a vulcanizing pan, not shown, for vulcanization, and a hose having the bent configuration is completed.

(3) Function and Advantage of the Embodiment

The configuration of the embodiment provides the following advantages in addition to the advantage that has been described before.

(3)-1 According to the hose extrusion method of the embodiment, the extruded tubular member H which is straight in shape or even the extruded tubular member having the three-dimensional bent configuration with various radii of curvatures can be fabricated by extruding the rubber material continuously while controlling the position of the core-side die 26 in the axial direction or the rotating direction, that is, changing the circumferential contact areas of the rubber material with the opening-side inner circumferential surface 25a and the core-side outer circumferential surface 26d of the extrusion die 23, whereby superior productivity can be provided.

(3)-2 A mandrel like the one described in the related art does not have to be inserted into the extruded tubular member HA for bending, and the work involved becomes simple, the superior productivity being thereby provided.

(3)-3 The extrusion opening 28 is constant and only the circumferential extruding velocities differ, whereby the resulting extruded tubular material HA has a constant thickness.

The invention is not limited to the embodiment that has been described heretofore and hence can be carried out in various forms without departing from the spirit and scope thereof. For example, the following modification can be adopted.

While the rubber hose has been described as being the tubular member in the aforesaid embodiment, the invention is not limited thereto. The invention can be applied to tubular members that are made of various types of tubular materials including elastomer and metal.

What is claimed is:

1. A method for forming an extruded tubular member having a three-dimensionally curved shape and two or more different radiuses of curvature, which comprises:
    introducing a material into an extrusion die having an extrusion orifice, the extrusion orifice having an inner circumferential surface that is disposed at an opening-side of the extrusion orifice and has a circular section, and a core-side die disposed concentrically with the extrusion orifice, the core-side die having a distal end portion terminating in an inclined plane which results when a circular cylinder is cut obliquely through an entire cross-sectional area of the circular cylinder;
    continuously extruding a tube of the material through an extrusion passage defined between the inner circumferential surface and an outer circumferential surface of the core-side die; and
    bending the extruding tube material by changing contact areas where the extruding tube material contacts the inner circumferential surface and the outer circumferential surface in a circumferential direction and setting velocities at which the tube material is extruded through the extrusion orifice to different values in the circumferential direction while adjusting positions of the inclined plane of the distal end portion of the core-side die in rotating and axial directions relative to the extrusion orifice using a die position control mechanism.

2. The method for forming an extruded tubular member according to claim 1, further comprising moving and repositioning the inclined plane of the distal end portion of the core-side die while continuously extruding and bending the extruded member and forming an extruded tubular member having two radiuses of different curvature.

3. The method for forming an extruded tubular member according to claim 1, which further comprises changing the velocities of the extruding tube material in the circumferential direction during the continuously extruding and bending steps and forming an extruded tubular member having the two radiuses of different curvature.

4. The method for forming an extruded tubular member according to claim 3, wherein the step of changing the velocities of the continuously extruding material in the circumferential direction is achieved by rotating the inclined plane of the distal end portion of the core-side die by operation of the die position control mechanism.

5. The method for forming an extruded tubular member according to claim 1, which includes:
    adjusting the inclined plane of the distal end portion of the core-side die relative to the extrusion orifice to set equal contact areas where the extruding tube material contacts the inner circumferential surface and the outer circumferential surface in a circumferential direction and extruding the extruding tube material at the same velocity along the circumferential direction, and
    forming the extruded tubular member having a section with a straight cylindrical shape.

6. The method for forming an extruded tubular member according to claim 5, wherein:
    after forming the extruded tubular member having a section with a straight cylindrical shape,
    moving the inclined plane of the distal end portion of the core-side die to a position where the contact areas of the extruding tube material with the core-side outer circumferential surface and the opening-side inner circumferential surface are different, and
    forming the extruded member having a section with a bent shape.

7. The method for forming an extruded tubular member according to claim 1, wherein the tube material is rubber.

8. The method for forming an extruded tubular member according to claim 1, wherein the tube material is metal.

9. The method for forming an extruded tubular member according to claim 1, wherein the tube material is an elastomer.

10. A method for forming an extruded tubular member having at least two or more different radiuses of curvature including at least one straight section and at least one curved section with a three-dimensionally curved shape, which comprises:

introducing a material into an extrusion die having an extrusion orifice, the extrusion orifice having an inner circumferential surface that is disposed at an opening-side of the extrusion orifice and has a circular cross section, and a core-side die disposed concentrically with the extrusion orifice, the core-side die having a distal end portion terminating in an inclined plane which results when a circular cylinder is cut obliquely through an entire cross-sectional area of the circular cylinder;

continuously extruding a tube of the material through an extrusion passage defined between the inner circumferential surface of the extrusion orifice and an outer circumferential surface of the core-side die, which comprises:

initially extruding the tube material through the extrusion orifice at velocities that provide the extruding tube with one of the straight section and the curved section, the velocities being determined by contact areas where a circumferential surface of the extruding tube material contacts the inner circumferential surface of the extrusion orifice and the outer circumferential surface of the core-side die, and adjusting the contact areas by at least one of rotating and axially moving the inclined plane of the distal end portion of the core-side die relative to extrusion orifice, changing the velocities at which the tube material is extruded through the extrusion orifice to different values and extruding the tube material to have the other of the straight section and the curved section.

* * * * *